United States Patent Office.

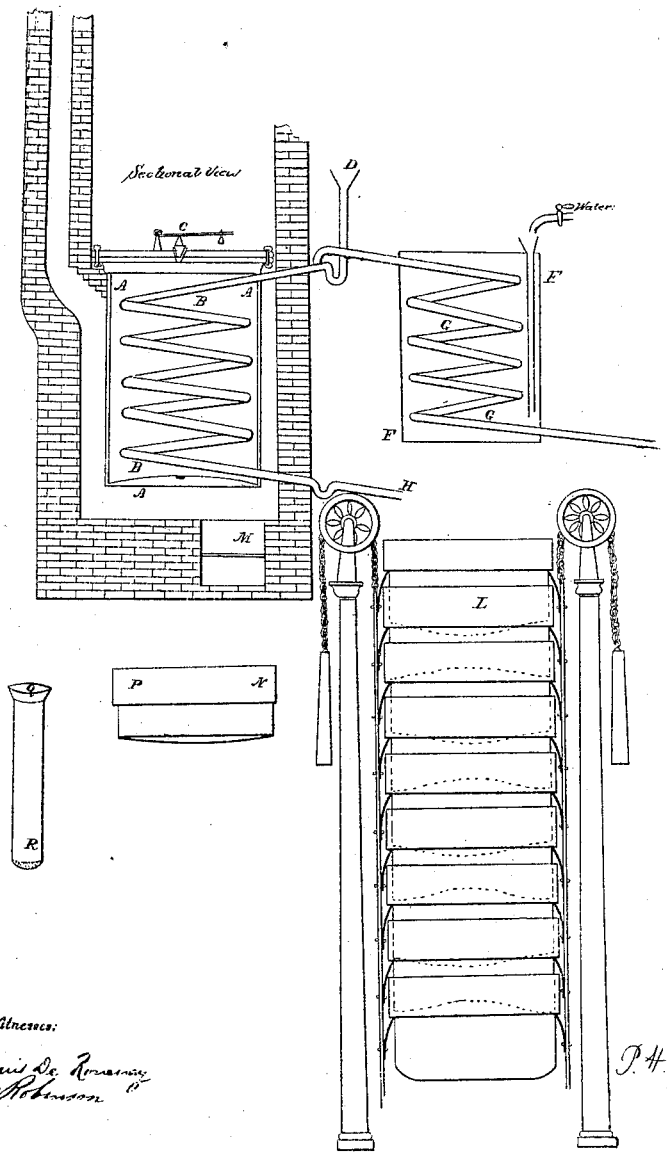

P. H. VANDER WEYDE, M. D., OF PHILADELPHIA, PENNSYLVANIA.

Letters Patent No. 61,125, dated January 8, 1867.

IMPROVEMENT IN REFINING PETROLEUM AND LUBRICATING OILS.

The Schedule referred to in these Letters Patent and making part of the same.

TO ALL WHOM IT MAY CONCERN:

Be it known that I, P. H. VANDER WEYDE, of the city and county of Philadelphia, State of Pennsylvania, have invented an Improved Method of Purifying those heavy kinds of Petroleum which by their deficiency in volatile products are not adapted to a profitable distillation for procuring illuminating oils, but which are used as lubricators for machinery, &c.

Distillation and treatment with acids destroy the most valuable lubricating qualities of those oils. It is, however, desirable to deprive them of their impurities and dark coloring matter, which spoil the products of many manufactories, where this oil has been used, with indelible spots. Filtration will do for these oils what distillation does for the other lighter kinds; and the nature of my invention consists in the preparation of this oil for the filtering process, the arrangement of the filters, and the economical manner of reviving the charcoal, artificial bone-black, or other material used for filtering purposes.

In order to enable others skilled in this kind of business to make use of this invention, I give here a detailed description of my process, reference being had to the accompanying drawings.

A A A A is a small steam boiler placed over the furnace M; it is filled with water in which the oil B B is placed. This steam boiler, possessing a safety-valve, C, is able to stand a pressure of ninety pounds, or six atmospheres, at least, corresponds to a temperature of 320°. The coil is intended to heat the oil, in passing it through, before bringing it into the filter, in the same time condensing, collecting, and thus saving all the gasoline, naphtha, and benzine given off by the oil at that temperature; this arrangement of placing the coil in hot water guaranteeing, in the same time, that the oil cannot become as hot as is the case over a naked fire, and thus lose its lubricating qualities by being chemically decomposed by the heat. The vapors are condensed in the usual way by the coil G G, placed in the cooling vessel F F, and collected in an appropriate receptacle. The oil thus heated and deprived of its most volatile ingredients, which are useless and even injurious as lubricators, has exit at H, which exit tube is provided with the usual trap in order to prevent the naphtha vapors to escape here; from H it flows in my percolator, patented April 10, 1866, No. 53,905, used here as a filter, and filled with the filtering material, charcoal, my artificial bone-black, in combination with substances mentioned in said patent, or any other filtering material which experience may demonstrate best for each particular kind of oil. The oil passing through the filters will cool in its downward course, and be clean and ready for use, provided the filter is high enough, and the oil passes slowly. Inexperienced persons may suppose that an objection to this percolator is, that it does not allow the hydraulic pressure of a high column of liquid, being subdivided by diaphragms, in which the pressure cannot be more than the height of each box, (two feet,) but experience is there to prove that petroleum, glycerine, and many other liquids of similar consistency, will not filter clear when passed through a filter under pressure, but only when with small pressure they run quickly through the filter. This peculiar property gives a great advantage to my percolator and filtering machine for the here-described purpose. The last part of the operation is the reviving or re-burning of the charcoal or other filtering material. To accomplish this, each box, P N, is emptied in a high narrow cylinder, Q R, with perforated bottom, in which it may be drained for a few hours, or, what is better, placed horizontally in a centrifugal machine, the top opening near the centre, the perforated bottom outward, and a proper receptacle for the oil attached. It is quickly turned round to accomplish this separation of the liquid adhering to the filtering material in a few minutes. The filtering material is then placed in a retort similar to those used in sugar refineries for reviving the bone-black, except that it is closed and provided with a tube for the exit of the vapors, and those vapors, being condensed in a proper condenser, will give a considerable quantity of good kerosene, fit for illuminating purposes, the filtering material in the same time becoming revived and adapted for repeated use.

What I claim as my invention, and wish to secure by Letters Patent, is—

1. The heating of the heavy petroleum in a steam coil, in the manner described, thus preparing it for the filter, and in the same time saving and condensing the vapors arising, namely, gasoline, naphtha, and benzine.

2. The combination of this continuous heating apparatus, with a percolator or filter, substantially as described.

3. The rapid draining, cleaning, and partial drying of the exhausted filtering or percolated material by placing it in the elongated boxes described, and submitting it to the action of a centrifugal machine.

4. The manner of reviving, by distillation in a retort, the filtering material, producing in the same time a quantity of kerosene for illuminating purposes.

In testimony whereof I have signed my name to this specification in the presence of two subscribing witnesses.

P. H. VANDER WEYDE.

Witnesses:
    WM. ROBINSON,
    S. J. WILBERHAM.